(12) United States Patent
Rossel et al.

(10) Patent No.: US 12,440,517 B2
(45) Date of Patent: Oct. 14, 2025

(54) SOFT GUMMY

(71) Applicant: Oystershell NV, Merelbeke (BE)

(72) Inventors: Bart Rossel, Merelbeke (BE); André Antunes, Merelbeke (BE); Laurens De Schepper, Merelbeke (BE); Mike Van Ganse, Merelbeke (BE)

(73) Assignee: Oystershell NV, Merelbeke (BE)

( * ) Notice: Subject to any disclaimer, the term of this patent is extended or adjusted under 35 U.S.C. 154(b) by 536 days.

(21) Appl. No.: 17/936,506

(22) Filed: Sep. 29, 2022

(65) Prior Publication Data

US 2024/0108663 A1 Apr. 4, 2024

(51) Int. Cl.
*A61K 35/644* (2015.01)
*A61K 9/00* (2006.01)
*A61K 47/10* (2017.01)
*A61K 47/36* (2006.01)

(52) U.S. Cl.
CPC .......... *A61K 35/644* (2013.01); *A61K 9/0056* (2013.01); *A61K 47/10* (2013.01); *A61K 47/36* (2013.01)

(58) Field of Classification Search
None
See application file for complete search history.

(56) References Cited

U.S. PATENT DOCUMENTS

| 6,627,236 B1 | 9/2003 | Barbeau |
| 2007/0269577 A1 | 11/2007 | Pershad |
| 2012/0035277 A1 | 2/2012 | Davis |

FOREIGN PATENT DOCUMENTS

| WO | 2012/017054 A1 | 2/2012 |
| WO | 2015/042723 A1 | 4/2015 |
| WO | 2022/104339 A1 | 5/2022 |

*Primary Examiner* — Michael V Meller
(74) *Attorney, Agent, or Firm* — Vorys, Sater, Seymour and Pease LLP

(57) ABSTRACT

The current invention relates to a soft gummy for therapeutic oral use, said soft gummy comprising an outer shell encapsulating an inner liquid, wherein said outer shell comprises: (i) a pectin; and (ii) honey in an amount of at least 25 wt. % relative to the weight of the outer shell; wherein said inner liquid has a moisture content of at least 10 wt. % as measured by ISO 760:1978 and a viscosity of at most 50.0 Pa s measured at 20° C., and wherein the soft gummy comprises a hydrolysable tannin or source of hydrolysable tannin. The invention also relates to a use of a soft gummy.

11 Claims, No Drawings

SOFT GUMMY

FIELD OF THE INVENTION

The present invention relates, in a first aspect, to a soft gummy for therapeutic oral use. In a second aspect, the present invention also relates to a use of a soft gummy for therapeutic oral use.

BACKGROUND

A cough medicine or a cough and cold medicine, is a medicinal drug used in those with coughing and related conditions, particularly associated with inflammation of the respiratory system. This could also include liquid medicine for daytime or nighttime relief of cold, flu, allergies, or sleeplessness.

Cough medicines typically comprise drugs with painkilling and fever-reducing properties, like for example ibuprofen (IBU) or dextromethorphan (DXM) this is a cough suppressant in quantities of up to 5% b.w. but also actives of natural origin like for example dry extracts of ivy willow is more common for this medical purpose. The medicines are offered in liquid or solid form, as for example syrups, sprays, tablets, pills, capsules, pastilles or hard candies, starch cast strips.

Individuals may find it difficult to swallow tablets and capsules, particularly if they are large. Avoidance of taking medications can lead to low levels of drug efficacy, resulting in prolonged or worsening symptoms and/or failure to treat or cure the indicated malady.

Cough syrups do not have these difficulties with swallowing. Cough syrups furthermore provide a mechanical method of action; by providing a sweet and soothing layer to the throat thereby providing immediate relief to dry cough and/or sore throat. However, cough syrups are generally sticky liquids which are difficult to use, difficult to dose accurately and cannot be used discretely.

Hydrophilic cellulose polymers are commonly used as the excipient base in tableted slowly eroding matrix systems. The effectiveness of these erodible hydrophilic matrix systems is due to a successive physic-chemical process of hydration of the cellulosic polymers. U.S. Pat. No. 9,877,971 describes oral, slow releasing pharmaceutical compositions suitable for chewing or sucking comprising non-systemic corticosteroid soft lozenges. Said composition comprises gelatins, plasticizers, sweeteners, corticosteroids, release modifiers, pH modifiers and water. The composition orally disintegrates within about 30-45 minutes upon oral administration to a subject in need thereof. It is known that gelatin-based gels are not suited to encapsulate high moisture content fillings. Water could migrate and destroy the gelatin structure.

Another problem relates to APIs which lose their active properties or are completely lost as a result of the physical conditions (e.g. temperature, humidity, flow, etc.) that are present during the development and/or production phase of the formulation. Exposure to extreme temperatures and humidity causes structural degradation and changes in chemical behavior of an API. For example, certain APIs have shown that they are not suitable for hot melt extrusion, a general production method for polymers. In addition, certain APIs also exhibit chemical interaction with residual solvents commonly used for polymer processing, or in certain cases the APIs may even react with the polymer itself when coupled together. All these situations lead to impurities in the API formulation that have no therapeutic value and may even be harmful (i.e., genotoxic).

The present invention aims to resolve at least some of the problems and disadvantages mentioned above.

SUMMARY OF THE INVENTION

The present invention and embodiments thereof serve to provide a solution to one or more of above-mentioned disadvantages. To this end, the present invention relates, in a first aspect, to a soft gummy according to claim 1.

The soft gummy according to claim 1 provides an easy-to-use dosage form. There is no requirement to handle or dose sticky liquids nor swallow large pills or capsules. The soft gummy combines the advantages of a solid dosage form, i.e. ease of use, reduced chance of spilling, improved dosage control and single dosage packaging with the advantages of a syrup, i.e. application of a sweet syrup which may provide relief cough symptoms.

The soft gummy according to claim 1 is designed to disintegrate in the oral cavity. Soft gummies can be chewed or allowed to dissolve slowly in the mouth. Upon breakage of the outer shell, the inner liquid is immediately released into the oral cavity, providing immediate relief as customary with cough syrups. These dosage forms can be flavored and thus are administrable to both pediatric and geriatric patients. Advantageously, the outer shell shows excellent chemical and physical properties. In particular, the outer shell forms a strong capsule which allows the storage of a relatively large amount of liquid with a high moisture content. Where center-filled gels are known, the amount of liquid and their moisture content is typically too limited.

Said outer shell shows excellent chemical and physical properties. The outer shell provides a strong capsule around the inner liquid which bursts. Preferred embodiments of the soft gummy are described herein.

In a second and third aspect, the present invention relates to a therapeutic use of a soft gummy, potentially an oral use in the treatment or prevention of a cough or cold. The therapeutic oral use of said soft gummy is suitable to prevent or reduce symptoms of coughing, as induced by many respiratory diseases. Furthermore, active ingredients may be incorporated into the inner liquid. The soft gummy as described herein provides an advantageous effect in the treatment or prevention of cough or cold.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight", "weight percent", "wt. %", "% wt" or "wt %", here and throughout the description unless otherwise defined, refers to the relative weight of the respective component based on the overall weight of the formulation.

"Pectin" is a heterogeneous complex polysaccharide found in higher plants, however commercially it is usually derived from citrus peel or apple pomace. Structurally, pectin is composed of linear segments of 1,4-linked a-D galactopyranosyluronic acid units in which some of the carboxyl groups are esterified with methanol.

The term "honey" means the sweet, viscous liquid produced in the honey producing tract of various bees. Bees can make honey from the nectar of flowers, from other soluble disaccharides or from small oligosaccharide carbohydrates.

"Tannins" are widely distributed in plants and can be divided in 3 groups: hydrolysable tannins, condensed tannins and phlorotannins. "Hydrolysable tannins" are a group of compounds formed by phenolic acids and their derivatives through glycoside bonds or ester bonds with glucose or polyols. They are further divided into gallotannins containing only galloyl groups, ellagitannins containing hexahydroxydiphenoyl group(s), and hydrolysable tannin oligomers divided into dimers, trimers, and tetramers according to the number of glucose nuclei. Examples of hydrolysable tannins are pentagalloyl glucose, pedunculagin, castalin and castalagin. A source of hydrolysable tannin is any food-grade plant extract comprising hydrolysable tannins. Hydrolysable tannins can be extracted from a wide variety of vegetable plants, such as chestnut wood (*Castanea sativa*), oak wood (*Quercus robur, Quercus petraea* and *Quercus alba*), tara pods (*Caesalpinia spinosa*), gallnuts (*Quercus infectoria* and *Rhus semialata*), myrobalan (Terminalia chebula), sumac (*Rhus coriaria*) and Aleppo gallnuts (Andricus *kollari*). Any suitable extract from these plants, still comprising said hydrolysable tannins, would fall within the definition of "source of hydrolysable tannins". When the amount of the hydrolysable tannins is specified, this refers to the weight of the hydrolysable tannin, excluding plant extract and other compounds which do not fall within the group of hydrolysable tannins.

The term "active pharmaceutical ingredient" (API) is used interchangeably with the terms "drug substance", "drug", "compound", "therapeutic agent", etc. It includes small molecules, either free base, free acid, or pharmaceutically acceptable salts or solvates thereof, large molecules, such as peptides and proteins, nucleosides, nucleotides, or the like.

In a first aspect, the invention relates to a soft gummy for therapeutic oral use, said soft gummy comprising an outer shell encapsulating an inner liquid, wherein said outer shell comprises:
(i) a pectin; and
(ii) honey.

The inventors have observed that the combination of pectin, honey and hydrolysable tannin is suitable to form a gel suitable to hold a liquid with high moisture content. Furthermore, this gel remains stable for a sufficiently long period of time. The resulting outer shell shows excellent qualities to release the inner liquid in the mouth. The outer shell is strong enough to store the inner liquid for long periods of time, restricting the permeation of moisture through said outer shell. When placed in the mouth, the outer shell will burst, and the inner liquid will be spread across the mouth. The inner liquid, preferably a syrup, may form a thin layer in the throat thereby providing immediate relief to irritated or sore throat. The soft gummy can be used to sooth an irritated throat.

The outer shell, if not chewed through, will slowly erode in saliva. When the outer shell ruptures, the inner liquid is suddenly released. As such, the soft gummy provides for a soft gummy dosage form which makes the inner liquid suitable to oral delivery, wherein the inner liquid is provided as liquid from oral cavity onwards.

The outer shell shows excellent qualities to encapsulate an inner liquid. The outer shell provides an oxygen free environment for the inner liquid, thereby improving its shelf life. The soft gummy for therapeutic oral use contains a predefined quantity of inner liquid. The quantity of the inner liquid is thus strictly regulated and controlled. Human mistakes are less likely to influence the dose taken and special measuring devices or cups are not needed. Differences in household spoons cannot affect the dose. Furthermore, the soft gummy is not sticky and cannot be spilled whereas conventional syrups can cause these issues.

Pectin has a complex heterogeneous structure and is composed chiefly of polygalacturonic chains having a wide variety of molecular weights. Some of the carboxyl groups are esterified with methyl alcohol, some are neutralized with cations, and some are free acids. Pectins are predominantly linear polymers of mainly α-(1-4)-linked D-galactouronic acid residues interrupted by 1,2-linked L-rhamnose residues.

In an embodiment, honey is present in an amount of at least 25 wt. % relative to the weight of the outer shell, preferably in an amount of at least 30 wt. %, more preferably in an amount of at least 35 wt. %, more preferably in an amount of at least 40 wt. %, more preferably in an amount of at least 45 wt. %, more preferably in an amount of at least 50 wt. %, more preferably in an amount of at least 55 wt. %, even more preferably in an amount of at least 60 wt. %. In an embodiment, honey is present in an amount between 55-99 wt. % relative to the weight of the outer shell, preferably in an amount between 60-99 wt. %, more preferably between 60-97 wt. %, even more preferably between 60-90 wt. %. The sugar and cellulose in honey advantageously lends itself to cross-linking with pectin and tannic acid. Honey advantageously is well tolerated, provides a sweet taste, has good anti-bacterial, anti-inflammatory and antimicrobial. Honey acts as an autolytic debridement agent on wounds, as a cough suppressant, analgesic, remedy for dyspepsia, and natural anticancer agent. Furthermore, honey is bio-based.

In an embodiment, said inner liquid has a moisture content of at least 10 wt. % relative to the weight of the inner liquid, as measured by ISO 760:1978. Because the outer shell comprises a combination of pectin, honey and a hydrolysable tannin, the outer shell is suitable to encapsulate an inner liquid with a moisture content greater than 10 wt. %, as measured by ISO 760:1978, for a prolonged period. Other materials, such as gelatin, can also form an outer shell but gelatin outer shells would not be suitable to encapsulate a liquid with such moisture content for longer periods of time. The water would migrate and can hydrolyze the outer shell. In a preferred embodiment, the inner liquid has a moisture content of at least 11 wt. % relative to the weight of the inner liquid as measured by ISO 760:1978, more preferably a moisture content of at least 12 wt. % relative to the weight of the inner liquid as measured by ISO 760:1978, more preferably a moisture content of at least 13 wt. % relative to the weight of the inner liquid as measured by ISO 760:1978, more preferably a moisture content of at least 14 wt. % relative to the weight of the inner liquid as measured by ISO 760:1978, more preferably a moisture content of at least 15 wt. % relative to the weight of the inner liquid as measured by ISO 760:1978, more preferably a moisture content of at least 16 wt. % relative to the weight of the inner liquid as measured by ISO 760:1978. In another preferred embodiment, the moisture content is at most 30 wt. % relative to the weight of the inner liquid as measured by ISO 760:1978, more preferably the moisture content is at most 25 wt. % relative to the weight of the inner liquid as measured by ISO 760:1978, most preferably the moisture content is at most 20 wt. % relative to the weight of the inner liquid as measured by ISO 760:1978.

In a preferred embodiment, the inner liquid has a viscosity of at most 50 Pa s (Pa.$) measured at 20° C. Because the inner liquid has a viscosity of at most 50 Pa s measured at 20° C., the inner liquid is suitable to burst out of the outer shell when the outer shell ruptures. The inner liquid has a sufficiently lower viscosity to provide a burst effect. When the soft gummy bursts, a liquid syrup is noticeably spread across the oral cavity and later down the throat. This further ameliorates the swift formation of soothing layer over the pharynx, providing immediate relief. In a preferred embodiment, the inner liquid has a viscosity of at most 25 Pa s measured at 20° C., more preferably a viscosity of at most 20 Pa s measured at 20° C., more preferably a viscosity of at most 10 Pa s measured at 20° C., more preferably a viscosity of at most 8 Pa s measured at 20° C., more preferably a viscosity of at most 6 Pa s measured at 20° C., more preferably a viscosity of at most 5 Pa s measured at 20° C. Viscosity is preferably measured according to 1502555. In an embodiment, the viscosity of the inner liquid measured at 20° C. is between 0.1 and 50.0 Pa s, preferably between 0.5 and 25.0 Pa s and more preferably between 1.0 and 10.0 Pa s.

In a preferred embodiment, the soft gummy comprises the inner liquid in an amount of at least 0.1 g, more preferably at least 0.2 g, more preferably at least 0.3 g, more preferably at least 0.4 g, more preferably at least 0.5 g, more preferably at least 0.6 g, more preferably at least 0.7 g, more preferably at least 0.8 g, more preferably at least 0.9 g, more preferably at least 1.1 g, more preferably at least 1.2 g, more preferably at least 1.3 g, more preferably at least 1.4 g, more preferably at least 1.5 g, more preferably at least 1.6 g, more preferably at least 1.7 g, more preferably at least 1.8 g, more preferably at least 1.9 g, more preferably at least 2.0 g. One advantage of the present invention is the ability to store and deliver to the oral cavity a relatively large amount of liquid with a relatively high moisture content compared to the prior art. This is required to provide sufficient syrup to the oral cavity to obtain the benefits from the mechanical action of syrup, as well as allowing higher doses to be delivered in general.

In a preferred embodiment, the soft gummy comprises the inner liquid in an amount of at least 5 wt. % relative to the weight of the soft gummy, more preferably in an amount of at least 10 wt. % relative to the weight of the soft gummy, more preferably in an amount of at least 15 wt. % relative to the weight of the soft gummy, more preferably in an amount of at least 20 wt. % relative to the weight of the soft gummy, more preferably in an amount of at least 25 wt. % relative to the weight of the soft gummy, more preferably in an amount of at least 30 wt. % relative to the weight of the soft gummy, more preferably in an amount of at least 35 wt. % relative to the weight of the soft gummy, more preferably in an amount of at least 40 wt. % relative to the weight of the soft gummy, more preferably in an amount of at least 45 wt. % relative to the weight of the soft gummy, more preferably in an amount of at least 50 wt. % relative to the weight of the soft gummy, more preferably in an amount of at least 55 wt. % relative to the weight of the soft gummy, more preferably in an amount of at least 60 wt. % relative to the weight of the soft gummy, more preferably in an amount of at least 65 wt. % relative to the weight of the soft gummy, more preferably in an amount of at least 70 wt. % relative to the weight of the soft gummy. Higher amounts of inner liquid are desirable, in particular when both mechanical as well as pharmaceutical methods of action are desired. For a mechanical method of action generally a certain higher amounts of liquid are required. To ensure the soft gummy remains manageable in size and weight, higher relative amounts of inner liquid are thus desirable or necessary.

In a preferred embodiment, the soft gummy comprises the inner liquid in an amount of at most 90 wt. % relative to the weight of the soft gummy, more preferably in an amount of at most 85 wt. % relative to the weight of the soft gummy, more preferably in an amount of at most 80 wt. % relative to the weight of the soft gummy, more preferably in an amount of at most 75 wt. % relative to the weight of the soft gummy, more preferably in an amount of at most 70 wt. % relative to the weight of the soft gummy, more preferably in an amount of at most 65 wt. % relative to the weight of the soft gummy, more preferably in an amount of at most 60 wt. % relative to the weight of the soft gummy, more preferably in an amount of at most 55 wt. % relative to the weight of the soft gummy, more preferably in an amount of at most 50 wt. % relative to the weight of the soft gummy, more preferably in an amount of at most 45 wt. % relative to the weight of the soft gummy, more preferably in an amount of at most 40 wt. % relative to the weight of the soft gummy, more preferably in an amount of at most 35 wt. % relative to the weight of the soft gummy, more preferably in an amount of at most 30 wt. % relative to the weight of the soft gummy. The trade-off for high amounts of inner liquid is a lower long-term stability and more difficulty with quality assurance. Reducing the amount of outer shell material in particular leads to higher chances of the soft gummy bursting, breaking or leaking prematurely. When the inner liquid is a syrup, this results in a sticky, difficult to clean and very unpleasant mess. A single soft gummy bursting in a jar, pocket or any other type of bulk packaging can easily ruin the contents of all other items therein. It is thus of high importance that sufficient strength as well as long term stability is ensured. By consequence, commercial products are typically over dimensioned when compared to laboratory counterparts. Where on laboratory scale producing gels comprising with a high amount of inner liquid is doable, producing such soft gummies in bulk while ensuring long term stability and no premature leakage occurs is far more difficult.

In a preferred embodiment, the soft gummy comprises the ratio by weight of the outer shell to the inner liquid is at most 100 to 1, more preferably at most 75 to 1, more preferably at most 50 to 1, more preferably at most 25 to 1, more preferably at most 20 to 1, more preferably at most 15 to 1, more preferably at most 10 to 1, more preferably at most 9 to 1, more preferably at most 8 to 1, more preferably at most 7 to 1, more preferably at most 6 to 1, more preferably at most 5 to 1, more preferably at most 4 to 1, more preferably at most 3.5 to 1, more preferably at most 3.0 to 1, more preferably at most 2.5 to 1, more preferably at most 2.0 to 1, more preferably at most 1.5 to 1, more preferably at most 1.0 to 1. A low ratio of outer shell to inner liquid is desirable when the method of action is focused on the inner liquid, i.e. in the case of a syrup. However, a low ratio of outer shell to inner liquid is generally difficult to obtain, in particular when stability is concerned. Generally reducing the ratio of outer shell material to inner liquid material increases the permeability through the outer shell and thus the migration of moisture from the inner liquid. Furthermore, decreasing the ratio of outer shell to inner liquid material increases the risk of the outer shell bursting or breaking at times where it should not.

In an embodiment, the soft gummy comprises a hydrolysable tannin or a source of hydrolysable tannin. In an embodiment, the inner liquid comprises hydrolysable tannin or a source of hydrolysable tannin. The hydrolysable tannin is suitable to soothe damaged mucus layers, by tightening said tissue. The combination of honey with a hydrolysable tannin, yields synergistic results. In an embodiment, the outer shell comprises a hydrolysable tannin. The inventors have unexpectedly observed that the combination of pectin, a hydrolysable tannin and a source of sugar creates a strong and stable gel, suitable to hold liquids even with a high moisture content. In other words, hydrolysable tannin aids in the gelation of pectin. Furthermore, the inventors have noted that hydrolysable tannin comprised within the inner liquid may still provide a thin impermeable layer at the gel-liquid interface between outer shell and inner liquid. In a more preferred embodiment, said hydrolysable tannin or source of hydrolysable tannin is tannic acid.

In an embodiment, the outer shell comprises 80-90 wt. % honey and 0.5-3 wt. % pectin. In an embodiment, the outer shell comprises 65-75 wt. % honey and 2-4 wt. % pectin. In an embodiment, the outer shell comprises 55-65 wt. % honey and 5-10 wt. % pectin. In an embodiment, the outer shell comprises 50-60 wt. % honey and 5-10 wt. % pectin. In an embodiment, the outer shell comprises 85-95 wt. % honey and 0.5-3 wt. % pectin. In an embodiment, the inner liquid comprises 80-90 wt. % honey and 0.5-3 wt. % hydrolysable tannin. In an embodiment, the inner liquid comprises 65-75 wt. % honey and 2-4 wt. % hydrolysable tannin.

In an embodiment, said pectin is chosen from the group of: high methoxyl (HM) pectin, low methoxyl (LM) pectin or low methoxyl amidated (LMA) pectin.

High Methoxyl (HM) Pectin is a type of pectin which has a degree of methoxylation (DM) greater than 50%. The DM refers to the number of carboxyl groups that are esterified with methanol on the pectin galacturonic acid backbone. HM pectins require a system containing over 55% solids and a low pH to gel. Low Methoxyl (LM) Pectin are pectins which have a DM lower than 50% (less than 50% of the carboxyl groups are methoxylated). LM pectins gel in the presence of calcium ions, but also with sugars and acids, however, their distinctive feature is the ability to gel in systems with low soluble solids. Low Methoxyl Amidated (LMA) Pectin is a type of pectin similar to the LM pectins, though some of the free carboxyl groups are 'amidated', meaning they have —$CONH_2$ groups on them. LMA pectins also require calcium ions to gel, though usually far less than LM pectins. In an embodiment, said pectin is high methoxyl (HM) pectin. It was found that HM pectin resulted, together with honey, in a stronger gel strength compared to LM pectins or LMA pectins. In an embodiment, said pectin is high methoxyl (HM) pectin, said high methoxyl (HM) pectin having a degree of esterification (DE) of at least 60, more preferably said HM pectin having a degree of esterification of at least 65, more preferably said HM pectin having a degree of esterification of at least 70, more preferably said HM pectin having a degree of esterification of at least 75, more preferably said HM pectin having a degree of esterification of at least 80, more preferably said HM pectin having a degree of esterification of at least 85. It was found that a higher degree of esterification resulted in an outer shell with better chemical and mechanical properties, in particular providing a longer shelf life to the soft gummy.

In a preferred embodiment, said pectin is high methoxyl (HM) pectin, said high methoxyl (HM) pectin is at least partially crosslinked, preferably said crosslinking is assisted by said hydrolysable tannin. Because the HM pectin is at least partially crosslinked, the outer shell is elastic and less brittle. The soft gummy has improved mechanical strength properties due to this crosslinking. In an embodiment, the HM pectin is at least partially crosslinked with the hydrolysable tannin. The resulting product acquires a greater compression modulus than is available to the HM pectin alone. In an embodiment, the pectin, honey, and a hydrolysable tannin are at least partially crosslinked. In an embodiment, the pectin, honey, and a hydrolysable tannin are chemically crosslinked. In an embodiment, the pectin, honey, and a hydrolysable tannin are physically crosslinked.

In an embodiment, the pectin is extracted from biomass via microwave assisted extraction, enzymatic extraction, supercritical water extraction or ultrasound extraction. In another embodiment, the pectin is extracted from biomass via hydrolysis using acids and subsequently precipitated by ethanol. In an embodiment, the pectin is extracted from biomass selected from: apple, pear, citrus, chicory, cauliflower, orange, lemon, cocoa, beet, melon, watermelon and passion fruit.

In an embodiment, said outer shell further comprises a dicarboxylic acid or a tricarboxylic acid. The dicarboxylic acid or tricarboxylic acid improved the gel formation and resulted in a stronger and more elastic outer shell. In an embodiment, said outer shell further comprises a dicarboxylic acid, preferably a linear saturated dicarboxylic acid, more preferably Oxalic acid, Malonic acid, Succinic acid, Glutaric acid or Adipic acid. In an embodiment, said outer shell further comprises a dicarboxylic acid, preferably an unsaturated dicarboxylic acid, more preferably Maleic acid, Fumaric acid, Glutaconic acid, Traumatic acid or Citraconic acid. In an embodiment, said outer shell further comprises a dicarboxylic acid, preferably a substituted dicarboxylic acid, more preferably Tartronic acid, Mesoxalic acid, Malic acid, Tartaric acid or Glutamic acid. In an embodiment, said outer shell further comprises a tricarboxylic acid, preferably Citric acid, Isocitric acid, Aconitric acid or Agaric acid. In a preferred embodiment, said outer shell comprises a dicarboxylic acid or tricarboxylic acid in an amount of at least 0.05 wt. % relative to the weight of the outer shell, more preferably in an amount of at least 0.1 wt. % relative to the weight of the outer shell, more preferably in an amount of at least 0.3 wt. % relative to the weight of the outer shell, more preferably in an amount of at least 0.5 wt. % relative to the weight of the outer shell, more preferably in an amount of at least 0.8 wt. % relative to the weight of the outer shell, more preferably in an amount of at least 1.0 wt. % relative to the weight of the outer shell.

In an embodiment, said inner liquid comprises honey. In a more preferred embodiment, said inner liquid comprises honey in an amount of at least 20 wt. % relative to the weight of the inner liquid, more preferably said inner liquid comprises honey in an amount of at least 25 wt. % relative to the weight of the inner liquid, more preferably said inner liquid comprises honey in an amount of at least 30 wt. % relative to the weight of the inner liquid, more preferably said inner liquid comprises honey in an amount of at least 40 wt. % relative to the weight of the inner liquid, more preferably said inner liquid comprises honey in an amount of at least 50 wt. % relative to the weight of the inner liquid, more preferably said inner liquid comprises honey in an amount of at least 60 wt. % relative to the weight of the inner liquid, more preferably said inner liquid comprises honey in an amount of at least 65 wt. % relative to the weight of the inner liquid, more preferably said inner liquid comprises honey in an amount of at least 70 wt. % relative to the weight of the inner liquid, more preferably said inner liquid comprises honey in an amount of at least 75 wt. % relative to the weight of the inner liquid, more preferably said inner liquid comprises honey in an amount of at least 80 wt. % relative to the weight of the inner liquid, more preferably said inner liquid comprises honey in an amount of at least 85 wt. % relative to the weight of the inner liquid, more preferably said inner liquid comprises honey in an amount of at least 90 wt. % relative to the weight of the inner liquid. In an embodiment, said honey is clover honey, wildflower honey, acacia honey, alfalfa honey, buckwheat honey, manuka honey, or eucalyptus honey. Honey, similar to other sweet syrups provides immediate relief to cough and cold as well as having antibacterial and antimicrobial properties. Furthermore, honey in combination with a source of hydrolysable tannin forms a suitable layer to soothe the mucus membranes.

In an embodiment, the soft gummy consists of an inner liquid and outer shell, wherein the weight ratio of the inner liquid over the outer shell is between 1:1 and 1000:1, preferably between 5:1 and 100:1.

In an embodiment, said inner liquid comprises a pharmaceutically active ingredient (API).

In an embodiment, said inner liquid comprises at least one antibiotic agent. In an embodiment, said inner liquid comprises at least one corticosteroid. In an embodiment, said inner liquid comprises at least one antibiotic agent, and at least one corticosteroid as active pharmaceutical ingredients (API). In another embodiment, said inner liquid comprises a pharmaceutically active ingredient, wherein said API is chosen from: lidocaine, prilocaine, levofloxacin, betamethasone, cyproheptadine, tricholine citrate, acetaminophen, phenylephrine, guaifenesin, dextrometorphan, aspirin, ibuprofen, diphenhydramine, antihistimine, naproxen sodium, fluticasone, budesonide, and their mixtures.

In an embodiment, said inner liquid comprises a pharmaceutically active ingredient (API), preferably a corticosteroid, more preferably the corticosteroid comprises one or more of alclometasone, amcinonide, beclometasone, betamethasone, budesonide, ciclesonide, clobetasol, clobetasone, clocortolone, cloprednol, cortivazol, deflazacort, deoxycorticosterone, desonide desoximetasone, dexamethasone, diflorasone, diflucortolone, difluprednate, fluclorolone, fludrocortisone, fludroxycortide, flumetasone, flunisolide, fluocinolone acetonide, fluocinonide, fluocortin, fluocortolone, fluorometholone, fluperolone, fluticasone, fluticasone propionate, fluprednidene, formocortal, halcinonide, halometasone, hydrocortisone aceponate, hydrocortisone buteprate, hydrocortisone butyrate, loteprednol, medrysone, meprednisone, methylprednisolone, methylprednisolone aceponate, mometasone furoate, paramethasone, prednicarbate, prednisone, prednisolone, prednylidene, rimexolone, tixocortol, triamcinolone, ulobetasol, combinations thereof, pharmaceutically acceptable salts thereof, or esters thereof.

The soft gummy is suitable to provide topical, non-systemic administration of one or more active pharmaceutical ingredients to the oral cavity and upper respiratory track, including the pharynx.

In an embodiment, said inner liquid comprises a grape flavor, a lemon flavor, a citrus flavor, a wintergreen flavor, a spearmint flavor, a peppermint flavor, a coffee flavor, a cocoa flavor, a pomegranate flavor, an acai berry flavor, a cinnamon flavor, a cranberry flavor, a ginseng flavor, a rose hips flavor, a rosemary flavor, a passion fruit flavor, a licorice flavor, a ginger flavor, a honey flavor, tartaric, malic acid, and citric acid, trisodium citrate. In an embodiment, said inner liquid comprises: kava (*Piper methysticum*), chamomile, melatonin, valerian (*Valeriana officinalis*), valerian root, skullcap (genus Scutellaria), or lemon balm (*Melissa officinalis*). In an embodiment, said inner liquid comprises extracts from: kava (*Piper methysticum*), chamomile, melatonin, valerian (*Valeriana officinalis*), valerian root, skullcap (genus Scutellaria), or lemon balm (*Melissa officinalis*). In an embodiment, said inner liquid comprises: ginger, coffee, coffee bean, gotu kola root, gotu kola extract, kola nut, cocoa, guarana, yerba mate and yerba mate extract, maca extract, L-theanine, *Huperzia serrata*, huperzine serrate, milk thistle leaf, milk thistle powder, milk thistle extract, blueberry extract, grape extract, green tea or green tea extract, propolis, turmeric, fennel, gingko biloba, ginseng, rose hips, pomegranate, acai berry, grape seed, lemon, lemon peel, lemon juice powder, cranberry, mint, cinnamon, cocoa, mint, spearmint (*Mentha spicula*), wild mint (*Mentha arvensis*), wintergreen (*Gaultheria procumbens*), rosemary, passion flower, *Glycyrrhiza* root (licorice root), cocoa, ginger, bee pollen, peppermint, peppermint leaf powder, lemon balm (*Melissa officials*), *Cannabis sativa*, tetrahydrocannabinol (THC), cannabidiol (CBD), propolis, honey, honey powder, monk fruit extract, *Stevia*, agave, fruit juice concentrates, kava (*Piper methysticum*), chamomile, melatonin, valerian (*Valeriana officinalis*), valerian root, lemon balm (*Melissa officinalis*), skullcap (genus Scutellaria) flax seed oil, hemp seed oil, tartaric, malic acid, citric acid, and sodium gluconate. In an embodiment, said inner liquid comprises: Black pepper, cinnamon, cumin, ginger, rose hips or any combination thereof. In an embodiment, the inner liquid comprises Colt's Foot, Mangosteen, Thyme Leaf, Wild Cherry Bark, Quercitin, Sundew, Butterbur, Grape Seed Extract or any combination thereof.

In an embodiment, the soft gummy comprises additional pharmaceutical excipients. Additional pharmaceutical excipients useful for the soft gummy as described herein include, for example, the following: acidifying agents (acetic acid, glacial acetic acid, citric acid, fumaric acid, hydrochloric acid, diluted hydrochloric acid, malic acid, nitric acid, phosphoric acid, diluted phosphoric acid, sulfuric acid, tartaric acid); alkalizing agents (ammonia solution, ammonium carbonate, diethanolamine, diisopropanolamine, potassium hydroxide, sodium bicarbonate, sodium borate, sodium carbonate, sodium hydroxide, trolamine); antifoaming agents (dimethicone, simethicone); antimicrobial preservatives (benzalkonium chloride, benzalkonium chloride solution, benzethonium chloride, benzoic acid, benzyl alcohol, butylparaben, cetylpyridinium chloride, chlorobutanol, chlorocresol, cresol, dehydroacetic acid, ethylparaben, methylparaben, methylparaben sodium, phenol, phenylethyl alcohol, phenylmercuric acetate, phenylmercuric nitrate, potassium benzoate, potassium sorbate, propylparaben, propylparaben sodium, sodium benzoate, sodium dehydroacetate, sodium propionate, sorbic acid, thimerosal, thymol); antioxidants (ascorbic acid, ascorbyl palmitate, butylated hydroxyanisole, butylated hydroxytoluene, hypophosphorous acid, monothioglycerol, propyl gallate, sodium formaldehyde sulfoxylate, sodium metabisulfite, sodium thiosulfate, sulfur dioxide, tocopherol, tocopherols excipient); buffering agents (acetic acid, ammonium carbonate, ammonium phosphate, boric acid, citric acid, lactic acid, phosphoric acid, potassium citrate, potassium metaphosphate, potassium phosphate monobasic, sodium acetate, sodium citrate, sodium lactate solution, dibasic sodium phosphate, monobasic sodium phosphate); chelating agents (edetate disodium, ethylenediaminetetraacetic acid and salts, edetic acid); coating agents (sodium carboxymethylcellulose, cellulose acetate, cellulose acetate phthalate, ethylcellulose, gelatin, pharmaceutical glaze, hydroxypropyl cellulose, hydroxypropyl methylcellulose, hydroxypropyl methylcellulose phthalate, methacrylic acid copolymer, methylcellulose, polyvinyl acetate phthalate, shellac, sucrose, titanium dioxide, carnauba wax, microcrystalline wax, zein); colorants (caramel, red, yellow, black or blends, ferric oxide); complexing agents (ethylenediaminetetraacetic acid and salts (EDTA), edetic acid, gentisic acid ethanolamide, oxyquinoline sulfate); desiccants (calcium chloride, calcium sulfate, silicon dioxide); emulsifying and/or solubilizing agents (acacia, cholesterol, diethanolamine (adjunct), glyceryl monostearate, lanolin alcohols, mono- and di-glycerides, monoethanolamine (adjunct), lecithin, oleic acid (adjunct), oleyl alcohol (stabilizer), poloxamer, polyoxyethylene 50 stearate, polyoxyl 35 castor oil, polyoxyl 40 hydrogenated castor oil, polyoxyl 10 oleyl ether, polyoxyl 20 cetostearyl ether, polyoxyl 40 stearate, polysorbate 20, polysorbate 40, polysorbate 60, polysorbate 80, diacetate, monostearate, sodium lauryl sulfate, sodium stearate, sorbitan monolaurate, sorbitan monooleate, sorbitan monopalmitate, sorbitan monostearate, stearic acid, trolamine, emulsifying wax); filtering aids (powdered cellulose, purified siliceous earth); flavors and perfumes (anethole, benzaldehyde, ethyl vanillin, menthol, methyl salicylate, monosodium glutamate, orange flower oil, peppermint, mint oil, peppermint spirit, rose oil, rose water, thymol, tolu balsam tincture, vanilla, vanilla tincture, vanillin); humectants (glycerol, hexylene glycol, sorbitol); plasticizers (e.g., castor oil, diacetylated monoglycerides, diethyl phthalate, glycerol, mono- and diacetylated monoglycerides, propylene glycol, triacetin, triethyl citrate); polymers (e.g., cellulose acetate, alkyl celluloses, hydroxyalkyl, acrylic polymers and copolymers); solvents (acetone, alcohol, diluted alcohol, amylene hydrate, benzyl benzoate, butyl alcohol, carbon tetrachloride, chloroform, corn oil, cottonseed oil, ethyl acetate, glycerol, hexylene glycol, isopropyl alcohol, methyl alcohol, methylene chloride, methyl isobutyl ketone, peanut oil, propylene carbonate, sesame oil, water for injection, sterile water for injection, sterile water for irrigation, purified water); sorbents (powdered cellulose, charcoal, purified siliceous earth); carbon dioxide sorbents (barium hydroxide lime, soda lime); stiffening agents (hydrogenated castor oil, cetostearyl alcohol, cetyl alcohol, cetyl esters wax, hard fat, paraffin, polyethylene excipient, stearyl alcohol, emulsifying wax, white wax, yellow wax); Suspending and/or viscosity-increasing agents (acacia, agar, alginic acid, aluminum monostearate, bentonite, purified bentonite, magma bentonite, carbomer, carboxymethylcellulose calcium, carboxymethylcellulose sodium, carboxymethylcellulose sodium 12, carrageenan, microcrystalline and carboxymethylcellulose sodium cellulose, dextrin, gelatin, guar gum, hydroxyethyl cellulose, hydroxypropyl cellulose, hydroxypropyl methylcellulose, magnesium aluminum silicate, methylcellulose, pectin, polyethylene oxide, polyvinyl alcohol, povidone, alginate, silicon dioxide, colloidal silicon dioxide, sodium alginate, tragacanth, xanthan gum); sweetening agents (aspartame, dextrates, dextrose, excipient dextrose, fructose, mannitol, saccharin, calcium saccharin, sodium saccharin, sorbitol, solution sorbitol, sucrose, compressible sugar, confectioner's sugar, syrup); tablet binders (acacia, alginic acid, sodium carboxymethylcellulose, microcrystalline cellulose, dextrin, ethylcellulose, gelatin, liquid glucose, guar gum, hydroxypropyl methylcellulose, methylcellulose, polyethylene oxide, povidone, pregelatinized starch, syrup); tablet and/or capsule diluents (calcium carbonate, dibasic calcium phosphate, tribasic calcium phosphate, calcium sulfate, microcrystalline cellulose, powdered cellulose, dextrates, dextrin, dextrose excipient, fructose, kaolin, lactose, mannitol, sorbitol, starch, pregelatinized starch, sucrose, compressible sugar, confectioner's sugar); tablet disintegrants (alginic acid, microcrystalline cellulose, croscarmellose sodium, crospovidone, polacrilin potassium, sodium starch glycolate, starch, pregelatinized starch); Tablet and/or capsule lubricants (calcium stearate, glyceryl behenate, magnesium stearate, sodium stearyl fumarate, stearic acid, purified stearic acid, talc, hydrogenated vegetable oil, zinc stearate); tonicity agent (dextrose, glycerol, mannitol, potassium chloride, sodium chloride); vehicle: flavored and/or sweetened (aromatic elixir, compound benzaldehyde elixir, iso-alcoholic elixir, peppermint water, sorbitol solution, syrup, tolu balsam syrup); vehicle: oleaginous (almond oil, corn oil, cottonseed oil, ethyl oleate, isopropyl myristate, isopropyl palmitate, myristyl alcohol, octyldodecanol, olive oil, peanut oil, persic oil, sesame oil, soybean oil, squalane); solid carrier (sugar spheres); sterile vehicle (bacteriostatic water for injection, bacteriostatic sodium chloride injection); viscosity-increasing agent (see suspending agent); water repelling agent (cyclomethicone, dimethicone, simethicone); and/or solubilizing agent (benzalkonium chloride, benzethonium chloride, cetylpyridinium chloride, docusate sodium, nonoxynol 9, nonoxynol 10, octoxynol 9, poloxamer, polyoxyl 35 castor oil, polyoxyl 40, hydrogenated castor oil, polyoxyl 50 stearate, polyoxyl 10 oleyl ether, polyoxyl 20, cetostearyl ether, polyoxyl stearate, polysorbate 20, polysorbate 40, polysorbate 60, polysorbate 80, sodium lauryl sulfate, sorbitan monolaurate, sorbitan monooleate, sorbitan monopalmitate, sorbitan monostearate, tyloxapol). This list is not meant to be exclusive, but instead merely representative of the classes of excipients and the particular excipients that may be used in oral dosage forms as described herein.

In an embodiment, the hydrolysable tannins comprise gallotannins. Gallotannins comprise galloyl groups. In an embodiment, the hydrolysable tannins comprise ellagitannins. Ellagitannins comprise hexahydroxydiphenoyl groups. In an embodiment, the hydrolysable tannins comprise tannins with two glucose nuclei. In an embodiment, the hydrolysable tannins comprise tannins with three glucose nuclei. In an embodiment, the hydrolysable tannins comprise tannic acid.

In an embodiment, the pressure inside the soft gummy is higher than 1 atm, preferably between 1.01 and 1.10 atm.

In an embodiment, the soft gummy orally disintegrates within about 1-10 minutes upon oral administration to a subject in need thereof, preferably within 1-5 minutes. The soft gummy has a faster disintegration time compared to most gelatin based pharmaceutical compositions. This can be particularly helpful for the delivery of syrup and optionally an API to the pharynx and oral cavity.

The present invention encompasses a novel product that benefits the respiratory tract. In particular, the novel herbal composition of this invention is useful in preventing and/or treating cough. The act of coughing is a complicated process. Disturbance of the respiratory tract and/or respiratory tract can trigger neurohumoral consequences that, ultimately, may result in cough. The cough reflex is truly a protective mechanism. However, in altered disease states, the cough frequency and severity can be greatly heightened, and dramatically affect one's quality of life. Many patients have chronic cough due to a combination of multiple causes (e.g., gastroesophageal reflux, asthma, rhinitis, etc.) Other patients with chronic cough have no determined etiology. Regardless of cause, prior treatment outcomes for a large number of patients having chronic cough remain dismal. There are several ways in which the soft gummy of the invention may act to treat cough, e.g., 1) via central nervous system action; 2) via local anesthetic effect 3) as a demulcent (soothing effect); 4) as a surfactant; 5) as an expectorant; 6) as a mucolytic; 7) as a antispasmodic; 8) as an antiinflammant; 9) as an antioxidant; 10) as an antihistamine; or 11) as a decongestant. It would, indeed, seem likely that combined effects provided by the soft gummy could have a greater chance of treatment success in a patient population in which no modality has previously worked. There are many combination cough preparations commercially available throughout the world. However, the novel soft gummy of the present invention provides a capsule with excellent release of the inner liquid.

In an embodiment, the present disclosure relates to soft gummies formulated such that the final soft gummies have a palatable and non-bitter taste profile. In some embodiments, the soft gummies are formulated to have a palatable and non-bitter taste profile through the use of honey. The taste and astringent mouthfeel of tannins limits their use. The addition of honey improves the taste and mouthfeel. In some embodiments, the bitterness taste profile of the soft gummy may be measured by a taste acceptability index (TAI).

As disclosed herein, the taste acceptability index (TAI) of a soft gummy of the present disclosure may be assigned by a panel of tasters. The TAI may be calculated by determining the presence and quantity of bitterness of soft gummy by each taster, assigning a numerical value to each soft gummy based on the degree of bitterness detected in the formulation scaled from 0 (extremely bitter and unpalatable taste profile) to 10 (no bitterness detected), and averaging the scores from each taster on the panel to identify the TAI of the given soft gummy. In some embodiments, a TAI score of about 0 to about 4 indicates a soft gummy that has an extreme or high level of bitter and/or unpalatable taste profiles. In some embodiments, a TAI score of about 5 to about 6 indicates a soft gummy that has a moderate to low level of bitter and/or unpalatable taste profiles. In some embodiments, a score of about 7 to about 10 indicates a soft gummy that has little to no bitter and/or unpalatable taste profiles. In some embodiments, the soft gummy may be formulated having a taste acceptability index (TAI) of about 6 to about 10. Soft gummies of the present disclosure can be formulated such that the product is not unpalatable but concurrently does not have a taste profile similar to a confectionary product. Additionally, the soft gummy can be formulated such that a slight bitter taste is detectable, which may be preferable for some individuals. Accordingly, in some embodiments, the soft gummy may be formulated having a taste acceptability index (TAI) of about 6 to about 8. In some embodiments, the soft gummy has a TAI of about 6 to about 10, about 6 to about 9, about 6 to about 8, about 6 to about 7, about 7 to about 10, about 7 to about 9, about 7 to about 8, about 8 to about 10, about 8 to about 9, or about 9 to about 10. In some embodiments, the soft gummy has a TAI of about 6 to about 8, about 6 to about 7, or about 7 to about 8.

In an embodiment, the soft gummy has a chewable bite index (CBI) of about 2 to about 5. In an embodiment, the thickness of the outer shell is 0.3 to 1.2 mm.

In some embodiments, the soft gummy further includes a wetting agent. In some embodiments, the wetting agent is selected from propylene glycol, propylene glycol alginate, glycerol, sorbitol, polyethylene glycol, maltitol syrup, lecithin, and any combination thereof. In some embodiments, the soft gummy includes the wetting agent in an amount that ranges from about 0.1% w/w to about 20% w/w. In some embodiments, the soft gummy further includes a pH-adjusting agent. In some embodiments, the pH-adjusting agent is one or more acids selected from citric acid, fumaric acid, malic acid, phosphoric acid, succinic acid, tartaric acid, maleic acid, acetic acid, hydrochloric acid, lactic acid, propionic acid, salts thereof, and derivatives thereof. In some embodiments, the pH-adjusting agent is malic acid, salts thereof, or derivatives thereof. In some embodiments, the pH-adjusting agent is citric acid, salts thereof, or derivatives thereof. In some embodiments, the pH-adjusting agent is succinic acid, salts thereof, or derivatives thereof. In some embodiments, the soft gummy further includes one or more base vehicles. In some embodiments, the one or more base vehicles are selected from maltitol, maltodextrin, maltitol syrup, corn syrup, xylitol, sucrose, dextrose, maltose, fructose, mannitol, erythritol, glycerol, isomalt, polydextrose, lactitol, lycasin, sorbitol, and any combination thereof. In some embodiments, the soft gummy further includes one or more sweeteners. In some embodiments, the one or more sweeteners are selected from sucrose, aspartame, sucralose, saccharin, sodium saccharin, acesulfame potassium, stevia, sodium cyclamate, inulin, isomalt, maltose, neohesperidin dihydrochalcone, trehalose, thaumatin, sorbitol, maltitol, and any combination thereof. In some embodiments, the soft gummy further includes a flavorant. In some embodiments, the flavorant includes one or more flavors selected from a mixed berry flavor, a mulberry flavor, a cherry flavor, a strawberry flavor, a citrus flavor, a lemon flavor, a lime flavor, an orange flavor, a grape flavor, a vanilla flavor, a chocolate flavor, a caramel flavor, a mint flavor, a spearmint flavor, a wintergreen flavor, and a menthol flavor. In some embodiments, the soft gummy further includes one or more colorants. In some embodiments, the one or more colorants are selected from FD&C Red 40, D&C Reds 3, 22, 28, 33 and 36, FD&C Yellows 5 and 6, D&C Yellow 10, FD&C Blues 1 and 2, FD&C Green 3, red iron oxide, caramel, beta-carotene, carmine, and any combination thereof.

In an embodiment, the inner liquid comprises: 25-99 wt. % honey; 0.1-10 wt. % hydrolysable tannin or a source thereof; 0.001-0.5 wt. % colorants; 0.01-5.0 wt. % flavors and perfumes, in particular chosen from the list of: anethole, benzaldehyde, ethyl vanillin, menthol, methyl salicylate, monosodium glutamate, orange flower oil, peppermint, mint oil, peppermint spirit, rose oil, rose water, thymol, tolu balsam tincture, vanilla, vanilla tincture, vanillin or a mixture thereof; and 0.2-5.0 wt. % di- or tricarboxylic acid; all wt. % relative to the weight of the inner liquid In an embodiment, the outer shell comprises: 25-99 wt. % honey; 0.1-30 wt. % pectin; 1-25 wt. % water; 0.02-5.0 wt. % di- or tricarboxylic acid; 0.02-5.0 wt. % of a salt of a di- or tricarboxylic acid; all wt. % relative to the weight of the outer shell.

In a second aspect, the invention relates to a use of a soft gummy according to the invention, for therapeutic oral use.

In a third aspect, the invention relates to a use of a soft gummy according to the invention, for therapeutic oral use, in the treatment or prevention of cough or cold.

In an embodiment, one dosage is one soft gummy. The dosage may, for example, be administered at least once a day, e.g., in five, four, three, two, or one dose a day. In one illustrative example, the dose is provided once a day. In specific embodiments, administration of any composition described herein (e.g., for the treatment of respiratory inflammation, throat irritation or cough) is once a day. In other specific embodiments, administration (e.g., for the treatment of respiratory inflammation, throat irritation or cough) is b.i.d. In still other embodiments, administration (e.g., for the treatment of respiratory inflammation, throat irritation or cough) is t.i.d. In another embodiment, administration (e.g., for the treatment of respiratory inflammation, throat irritation or cough) is q.i.d. In another embodiment, the dose is administered at night. In another aspect, the dose is administered about 30 minutes prior to bed, with no food or water given after administration of the compositions herein. In another embodiment, the dose is administered prior to bedtime. In specific embodiments, a gummy comprising a API is administered according to any method described herein, wherein administration of the API or composition is once a day, no more than once a day, more than once a day, twice a day, two to four times a day, three times a day, or four times a day. In some embodiments, the administration of the API or composition provided herein is administered at night, e.g., not more than once a day at night.

In another embodiment described herein, the dosage form can be administered, for example, 1×, 2×, 3×, 4×, 5×, 6×, 7×, or 8×, per day. One or more dosage form can be administered, for example, for 1, 2, 3, 4, 5, 6, 7 days, or even longer. One or more dosage forms can be administered, for example, for 1, 2, 3, 4 weeks, or even longer. One or more dosage forms can be administered, for example, for 1, 2, 3, 4, 5, 6, 7, 8, 9, 10, 11, 12 months, or even longer. One or more dosage forms can be administered until the patient, subject, mammal, mammal in need thereof, human, or human in need thereof, does not require treatment, prophylaxis, or amelioration of any disease or condition such as, for example, inflammation or pain. In some embodiments, the dosage form may be co-administered with other pharmaceutical compositions until the patient, subject, mammal, mammal in need thereof, human, or human in need thereof, does not require treatment, prophylaxis, or amelioration of any disease or condition including but not limited to inflammation or pain.

Another embodiment described herein is a soft gummy suitable for chewing, sucking, or buccal dissolution as described herein for treating, retarding the progression of, prophylaxis of, delaying the onset of, ameliorating, reducing the symptoms of, or promoting health, including but not limited to of one or more of oral, buccal, respiratory or esophageal inflammation, eosinophilic esophagitis, oral lichen planus, odynophagia, acid reflux, dysphagia, coughing, sore throat, common cold, virus infection such as a coronavirus (for example COVID-19), acute bronchitis, chronic bronchitis, pneumonia, influenza, asthma, bronchitis, chronic obstructive airways disease (COAD), bacterial infections (for example tuberculosis), postnasal drip, laryngitis, RSV, bronchiectasis, emphysema, unwanted side effects of other drugs, inhaling an irritant, allergies, pertussis, acute sinusitis, bronchiolitis, decrease in appetite, or failure to thrive. In another embodiment, the soft gummy described herein is suitable for reducing pain, cough, and soreness. In another embodiment, the soft gummy described herein is suitable to improve wound healing. The tannins can interact with the mucus layer, thereby tightening damaged tissue. In another embodiment, the soft gummy described herein protects intestinal mucosa.

Another embodiment described herein is a method for treating, retarding the progression of, prophylaxis of, delaying the onset of, ameliorating, reducing the symptoms of, or promoting health of one or more of oral, buccal, respiratory or esophageal inflammation, eosinophilic esophagitis, oral lichen planus, odynophagia, acid reflux, dysphagia, coughing, sore throat, common cold, virus infection such as a coronavirus (for example COVID-19), acute bronchitis, chronic bronchitis, pneumonia, influenza, asthma, bronchitis, chronic obstructive airways disease (COAD), bacterial infections (for example tuberculosis), postnasal drip, laryngitis, RSV, bronchiectasis, emphysema, unwanted side effects of other drugs, inhaling an irritant, allergies, pertussis, acute sinusitis, bronchiolitis, decrease in appetite, or failure to thrive, comprising administering to a subject in need thereof an oral soft gummy suitable for chewing, sucking, or buccal dissolution as described herein.

Another embodiment described herein is a soft gummy suitable for chewing, sucking, or buccal dissolution as described herein for treating a subject suffering from one or more of oral, buccal, respiratory or esophageal inflammation, eosinophilic esophagitis, oral lichen planus, odynophagia, acid reflux, dysphagia, coughing, sore throat, common cold, virus infection such as a coronavirus (for example COVID-19), acute bronchitis, chronic bronchitis, pneumonia, influenza, asthma, bronchitis, chronic obstructive airways disease (COAD), bacterial infections (for example tuberculosis), postnasal drip, laryngitis, RSV, bronchiectasis, emphysema, unwanted side effects of other drugs, inhaling an irritant, allergies, pertussis, acute sinusitis, bronchiolitis, decrease in appetite, or failure to thrive, or post-surgery inflammation.

Another embodiment described herein is a soft gummy suitable for treating a subject suffering from oral or respiratory inflammation, inflammatory bowel disease involving the pharynx, oral lichen planus, aphthous stomatitis, or post-surgery inflammation, including comprising administering to the subject in need thereof. This further relates to the use of an oral soft gummy suitable for chewing, sucking, or buccal dissolution as described herein.

Initial treatment may continue, for example, for about 3 days to 2 weeks for an acute condition, or about 4 weeks to about 16 weeks for a chronic condition, or about 8 weeks to about 12 weeks for a chronic condition. Longer therapy may also be needed, such as, for example, therapy similar to chronic therapy for persistent asthma. Patients may, for example, be treated for up to 6 months, or up to one year. Maintenance treatment can last up to or longer than one year. Patients may be treated on a maintenance basis or on an as needed basis during a problematic episode, depending on the severity of the condition. Patients can also be treated on a rotating treatment basis, where treatment is provided for a period of time and then the patient is taken off of the drug for a period before treatment resumes again. When off the drug, the patient may be given no treatment, treatment with another medication, or treatment with a reduced dosage.

Another embodiment described herein comprises administering one or more of the soft gummies described herein in combination with one or more additional active pharmaceutical ingredients. Another embodiment described herein comprises administering one or more of the soft gummies described herein comprising two or more active pharmaceutical ingredients.

In an embodiment, the inner liquid is produced by mixing all components, preferably at an elevated temperature until a homogenous mixture is obtained, subjecting said homogeneous mixture to a vacuum to remove gas bubbles therefrom, then cooling said homogeneous mixture. The mixture is then ready to used as inner liquid in a soft-gummy, preferably by concentric extrusion of the inner liquid and the outer shell.

In an embodiment, the outer shell is produced by mixing pectin in water at elevated temperature and high shear until homogeneous, followed by addition of all other components. Under mixing conditions, temperature is allowed to increase to at least 100° C. Heating is halted only once desired Brix levels are obtained. Preferably the desired Brix level is at least 65 Brix, more preferably at least 70 Brix, more preferably at least 72 Brix, more preferably at least 74 Brix, more preferably at least 75 Brix, more preferably at least 76 Brix, more preferably at least 77 Brix, more preferably at least 78 Brix, more preferably at least 79 Brix, more preferably at least 80 Brix, more preferably at least 81 Brix, more preferably at least 82 Brix, more preferably at least 83 Brix, more preferably at least 84 Brix, more preferably at least 85 Brix.

In a further embodiment, the soft gummy is produced by contacting an outer shell material with an inner liquid material in a nozzle comprising two openings. In an embodiment, the outer shell material is produced by heating a pectin and water mixture to 70-90° C.; adding honey and subsequently heating to 90-120° C.; and cooling. In an embodiment, the inner liquid material is produced by heating honey to 35-65° C.; adding hydrolysable tannin; and cooling.

In an embodiment, the present invention provides a method for providing an outer shell around an inner liquid, comprising the steps of:
1) applying a liquid gelling composition comprising a pectin and honey on the said outer surface of the inner liquid,
2) allowing the liquid gelling composition to gel while in contact with the inner liquid, therewith forming a gel layer directly covering the said inner liquid.

Preferably the soft gummy is formed by encapsulation of the inner liquid within the outer shell by concentric extrusion—dripping techniques. In such methods, the outer shell flows from the outer concentric nozzle first, followed by inner liquid flow from the inner concentric nozzle while flow from outer shell concentric nozzle continues. The inner liquid flow is stopped, then subsequently the outer shell flow is stopped. This sequence of liquid flows may be accompanied by a nozzle movement. Each sequence of liquid flows produces a single drop, which upon cooling down forms a stable soft gummy according to the first aspect of the present invention. Advantageously, no contacting the outer shell into gelation or fixation mixtures, such as mixture comprising calcium ions, is required.

By incorporation of honey, it was found that the gel layer prevents significant moisture loss from the inner liquid. As a result, improved shelf life as well as a more attractive appearance is obtained during storage. The skilled person is aware that high concentrations of honey can be used, at least 25 wt. % relative to the weight of the outer shell, preferably even 50 wt. %. The components of the said soft gummy are preferably food grade.

EXAMPLES

The invention is further described by the following non-limiting examples which further illustrate the invention, and are not intended to, nor should they be interpreted to, limit the scope of the invention.

Soft gummies with an inner liquid and outer shell as described in examples 1, 2 and 3 were produced. The ratio by weight of outer shell to inner liquid was 1:1 in example 1. In example 3 the gummy comprised 35 wt. % inner liquid to 65 wt. % outer shell.

The outer shell was obtained after mixing all ingredients until homogeneous, heating to 100-110° C. until a Brix value of at least 75 was obtained and subsequent cooling. The inner liquid was obtained after dissolving all ingredients in water, mixing and heating to 40-65° C. and subsequent cooling. Soft gummies were formed by concentric extrusion and dripping. The outer shell encapsulated the inner liquid completely, no leakage was detected. A soft gummy whereby the inner liquid bursts after rupture of the outer shell was obtained.

Example 1

| Layer of soft gummy | Ingredient (amount in wt. % per part) | Function |
| --- | --- | --- |
| Outer shell | Honey (59) | Flavor/Binding Agent/Active Ingredient |
|  | Pear pectin (16) | Binding Agent |
|  | Water (18) | Moisturizer |
|  | Fumaric acid (3) | Acidifying agent |
|  | Hydrolysable tannin (3.5) | Binding Agent/Active Ingredient |
|  | Trisodium citrate (0.5) | Flavor |
| Inner liquid | Honey (91) | Flavor/Binding Agent/Active Ingredient |
|  | Hydrolysable tannin (5) | Binding Agent/Active Ingredient |
|  | Caramel (0.2) | Coloring agent |
|  | Menthol (0.9) | Flavoring agent |
|  | Fumaric acid (2.3) | Acidifying agent |
|  | Glycerol (0.6) | Emulsifier |

Example 2

| Part of soft gummy | Ingredient (amount) | Function |
| --- | --- | --- |
| Outer shell | Honey (0.3 g) | Flavor/Binding Agent/Active Ingredient |
|  | Citrus pectin (0.05 g) | Binding Agent |
|  | Water (0.07 g) | Moisturizer |
|  | Tartaric acid (5 mg) | Acidifying agent |
| Inner liquid | Honey (1.0 g) | Flavor/Binding Agent/Active Ingredient |
|  | Hydrolysable tannin (0.1 g) | Binding Agent/Active Ingredient |
|  | Acetaminophen (120 mg) | Active Ingredient |
|  | Sorbitol (0.01 g) | Emulsifier |
|  | Stevia (2.4 mg) | Sweetener (optional) |
|  | Spearmint (8.7 mg) | Flavor |

Example 3

| Layer of soft gummy | Ingredient (amount in wt. % per part) | Function |
|---|---|---|
| Outer shell | Honey (75) | Flavor/Binding Agent/Active Ingredient |
| | Apple pectin (5) | Binding Agent |
| | Sucralose (4) | Sweetener |
| | Hydrolysable tannin (2) | Binding Agent/Active Ingredient |
| | Water (12) | Moisturizer |
| | Sodium carboxymethylcellulose (2) | Coating agents |
| Inner liquid | Honey (82) | Flavor/Binding Agent/Active Ingredient |
| | Citric acid (5) | Acidifying agent |
| | Water (10) | Moisturizer |
| | Hexylene glycol (0.1) | Emulsifier |
| | Vegetable oil (0.4) | Lubricants |
| | Beta- carotene (2) | Coloring agent |
| | Vanilla (0.5) | Flavor |

Examples 4-11

The effect of each component as well as heating duration of the outer shell was investigated. A needle puncture test was used to provide a combined indication of viscosity and gel strength. A weighted needle was placed on top of each composition, and the time required for the needle to pass through said composition was determined. All samples were heated and subsequently cooled prior to testing.

Comparative example 4 consisted of pure honey, heated 1 hour at 105° C. and subsequently cooled.

Comparative example 5 comprises 89% honey and 11% pectin. 25% water relative to the weight of honey and pectin was added. Honey and pectin were fully homogenized, for which high shear homogenization was required. The homogenized mixture was heated 1 hour at 105° C. and subsequently cooled.

Comparative example 6 comprises 89% honey and 11% pectin. 25% water relative to the weight of honey and pectin was added. Honey and pectin were fully homogenized, for which high shear homogenization was required. Citric acid was added in an amount of 1% by weight relative to the honey and pectin mixture. Trisodium citrate was added in an amount of 0.5% by weight relative to the honey and pectin. The homogenized mixture was heated 2 hours at 105° C. and subsequently cooled.

Comparative example 7 comprises 89% honey and 11% pectin. 25% water relative to the weight of honey and pectin was added. Honey and pectin were fully homogenized, for which high shear homogenization was required. Citric acid was added in an amount of 1% by weight relative to the honey and pectin mixture. Trisodium citrate was added in an amount of 0.5% by weight relative to the honey and pectin. The homogenized mixture was heated 3 hours at 105° C. and subsequently cooled.

Comparative example 8 comprises 89% honey and 11% pectin. 25% water relative to the weight of honey and pectin was added. Honey and pectin were fully homogenized, for which high shear homogenization was required. Citric acid was added in an amount of 1% by weight relative to the honey and pectin mixture. Trisodium citrate was added in an amount of 0.5% by weight relative to the honey and pectin. The homogenized mixture was heated 4 hours at 105° C. and subsequently cooled.

The difference between comparative examples 6, 7 and 8 is thus the time spent at elevated temperatures. The results showed a decrease in moisture content as well as volume. Furthermore, the formulations were darker compared to their initial color indicating caramelization took place.

Comparative example 9 did not comprise citric acid and trisodium citrate. Comparative example 9 comprises 89% honey and 11% pectin. 25% water relative to the weight of honey and pectin was added. Honey and pectin were fully homogenized, for which high shear homogenization was required. The homogenized mixture was heated 2 hours at 105° C. and subsequently cooled.

Example 10 comprises 89% honey and 11% pectin. 25% water relative to the weight of honey and pectin was added. Honey and pectin were fully homogenized, for which high shear homogenization was required. Tannic acid, a hydrolysable tannin, was added in an amount of 3% by weight relative to the honey and pectin. The homogenized mixture was heated 2 hours at 105° C. and subsequently cooled.

Example 11 comprises 89% honey and 11% pectin. 25% water relative to the weight of honey and pectin was added. Honey and pectin were fully homogenized, for which high shear homogenization was required. Citric acid was added in an amount of 1% by weight relative to the honey and pectin mixture. Trisodium citrate was added in an amount of 0.5% by weight relative to the honey and pectin. Tannic acid, a hydrolysable tannin, was added in an amount of 3% by weight relative to the honey and pectin. The homogenized mixture was heated 2 hours at 105° C. and subsequently cooled.

TABLE 1

Results of the needle penetration test of examples 4-11.

| | travel path (mm) | time (s) | needle speed (mm/s) |
|---|---|---|---|
| C. example 4 | 14.2 | <1 | >14.2 |
| C. example 5 | 15.6 | ~1 | 15.6 |
| C. example 6 | 11.8 | 42 | 0.28 |
| C. example 7 | 10.9 | 18 | 0.61 |
| C. example 8 | 9.6 | 15 | 0.64 |
| C. example 9 | 9.1 | 50 | 0.18 |
| Example 10 | 11.9 | 1710 | 0.0070 |
| Example 11 | 12.9 | >3600 | <0.0036 |

The results of the needle penetration tests are shown in table 1.

The addition of a hydrolysable source of tannin greatly increases the shell matrix strength as shown in examples 10 and 11.

The combination of a polycarboxylic acid, in this case citric acid, and a source of hydrolysable tannins, in this case tannic acid, appears to have a synergistic effect. The addition of citric acid in c. examples 6, 7 and 8 appears to lower the strength of the honey-pectin mixtures when compared to a composition without citric acid c. example 9. When a hydrolysable source of tannin is added, the opposite appears true. The addition of citric acid greatly increased the matrix strength, as is evident from comparing examples 10 and 11. The hydrolysable tannin and polycarboxylic acid thus have a synergistic effect with respect to the gel strength.

It is thus evident that a hydrolysable source of tannin is highly beneficial to greatly improve viscosity and gel strength. The effect may be further ameliorated by the addition of a polycarboxylic acid, preferably dicarboxylic acid or tricarboxylic acid, such as citric acid.

The invention claimed is:

1. A soft gummy consisting essentially of an outer shell encapsulating an inner liquid wherein the outer shell is pectin and at least 25 wt. % honey relative to the weight of the outer shell and the inner liquid comprises an extract of gallnuts comprising hydrolysable tannins and honey.

2. The soft gummy of claim 1, wherein said pectin is selected from the group consisting of high methoxyl (HM) pectin, low methoxyl (LM) pectin and low methoxyl amidated (LMA) pectin.

3. The soft gummy of claim 1, wherein said pectin is high methoxyl (HM) pectin, said high methoxyl (HM) pectin having a degree of methoxylation (DM) of at least 50.

4. The soft gummy of claim 1, wherein said pectin is high methoxyl (HM) pectin, said high methoxyl (HM) pectin having a degree of esterification (DE) of at least 60.

5. The soft gummy of claim 1, wherein said pectin is high methoxyl (HM) pectin, said high methoxyl (HM) pectin is at least partially crosslinked.

6. The soft gummy of claim 1, wherein said outer shell further comprises a dicarboxylic acid or a tricarboxylic acid.

7. The soft gummy of claim 1, wherein said outer shell comprises 1-10 wt. % of (i) pectin relative to the weight of the outer shell; and 50-90 wt. % of (ii) honey relative to the weight of the outer shell.

8. The soft gummy of claim 1, wherein said hydrolysable tannin is present in an amount of at least 0.5 wt. % relative to the weight of the inner liquid.

9. The soft gummy of claim 1, wherein said inner liquid further comprises menthol or a mint extract.

10. The soft gummy of claim 1, wherein said outer shell comprises at least 50 wt. % honey relative to the total weight of said outer shell, and wherein said inner liquid comprises at least 50 wt. % honey relative to the total weight of said inner liquid.

11. A method of treating a cold or a cough in a human in need thereof consisting essentially of administering the soft gummy of claim 1 to the human in need thereof to effectively treat the cold or cough in said human.

* * * * *